(12) United States Patent
Euler

(10) Patent No.: US 8,077,913 B2
(45) Date of Patent: Dec. 13, 2011

(54) METHOD AND DEVICE FOR DETERMINING THE ACTUAL POSITION OF A GEODETIC INSTRUMENT

(75) Inventor: Hans-Juergen Euler, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 946 days.

(21) Appl. No.: 10/595,189

(22) PCT Filed: Sep. 9, 2004

(86) PCT No.: PCT/EP2004/010045
§ 371 (c)(1),
(2), (4) Date: Jan. 29, 2007

(87) PCT Pub. No.: WO2005/038395
PCT Pub. Date: Apr. 28, 2005

(65) Prior Publication Data
US 2007/0133012 A1 Jun. 14, 2007

(30) Foreign Application Priority Data
Sep. 22, 2003 (EP) .................................. 03021133

(51) Int. Cl.
*G06K 9/00* (2006.01)
(52) U.S. Cl. ........ 382/103; 382/106; 382/287; 382/294; 382/302; 386/227; 701/213
(58) Field of Classification Search .................. 382/103, 382/106, 287, 294, 302; 386/227; 701/213
See application file for complete search history.

(56) References Cited

U.S. PATENT DOCUMENTS

| | | | |
|---|---|---|---|
| 5,100,229 A * | 3/1992 | Lundberg et al. | 356/3.12 |
| 5,396,331 A * | 3/1995 | Kitoh et al. | 356/611 |
| 5,517,419 A * | 5/1996 | Lanckton et al. | 701/216 |
| 6,233,523 B1 * | 5/2001 | Sood | 701/213 |
| 6,381,006 B1 | 4/2002 | Ramstrom | |
| 6,430,505 B1 * | 8/2002 | Green | 701/214 |
| 6,507,406 B1 * | 1/2003 | Yagi et al. | 356/602 |
| 6,526,352 B1 * | 2/2003 | Breed et al. | 701/213 |
| 6,563,574 B2 * | 5/2003 | Ohtomo et al. | 356/141.1 |
| 6,741,790 B1 * | 5/2004 | Burgess | 386/227 |
| 6,762,721 B2 * | 7/2004 | Halsey et al. | 342/442 |
| 6,859,269 B2 * | 2/2005 | Ohtomo et al. | 356/141.1 |
| 7,454,065 B2 * | 11/2008 | Satoh | 382/190 |
| 7,865,285 B2 * | 1/2011 | Price et al. | 701/50 |
| 2002/0045988 A1 * | 4/2002 | Yokota | 701/213 |
| 2002/0080064 A1 * | 6/2002 | Kim | 342/357.09 |
| 2003/0169414 A1 * | 9/2003 | Benz et al. | 356/5.1 |

(Continued)

FOREIGN PATENT DOCUMENTS
EP 0587328 3/1994
(Continued)

*Primary Examiner* — Jayesh A Patel
(74) *Attorney, Agent, or Firm* — Maschoff Gilmore & Israelsen

(57) ABSTRACT

In order to determine the actual position (A) of a geodetic measuring instrument (1) inside a dead range (T) wherein signals originating from a positioning system are shadowed, two reference structures (5) are detected from at least two known positions and the distances associated with the reference structures (5) are measured. Image information linked to said distance measurements is captured. Said information contains data on the arrangement of the reference structures (5). The actual position (1) can be derived from subsequent capture of the reference structures (5) from a position inside the dead range (T). Image processing methods are used advantageously to identify and measure the reference structures (5).

24 Claims, 6 Drawing Sheets

U.S. PATENT DOCUMENTS

| | | | |
|---|---|---|---|
| 2003/0202089 A1* | 10/2003 | Alhadef et al. | 348/42 |
| 2004/0105573 A1* | 6/2004 | Neumann et al. | 382/103 |
| 2005/0057745 A1* | 3/2005 | Bontje | 356/139.03 |
| 2008/0205707 A1* | 8/2008 | Braunecker et al. | 382/106 |

FOREIGN PATENT DOCUMENTS

| | | |
|---|---|---|
| EP | 587328 A2 * | 3/1994 |
| FR | 2814539 | 3/2002 |
| JP | 61028814 | 2/1986 |

* cited by examiner

METHOD AND DEVICE FOR DETERMINING THE ACTUAL POSITION OF A GEODETIC INSTRUMENT

The invention relates to a method for determining the actual position of a geodetic instrument, a device for carrying out this method, a geodetic instrument and a computer program product.

BACKGROUND

In many geodetic applications, methods and systems for position determination of a geodetic instrument are used, which methods and systems are based on the propagation of signals which can be shadowed and thus limited in their usability. Global positioning systems, such as, for example, GPS, GLONASS or the European Galileo system under construction are an example of such position-determining systems. These systems are based on the reception of satellite signals in a form as undisturbed as possible. In the immediate vicinity of obstacles, the reception of the signal may be limited or completely impossible owing to the shadowing effect thereof, so that a position determination is no longer possible by means of the system. A further example is the position determination of a reflector-bearing instrument comprising a theodolite or tacheometer. By means of a direction and distance measurement with the tacheometer to the geodetic instrument the position of the instrument can also be determined when the position of the tacheometer is known. A precondition for the measurement here is the visual link between the two components. If this link is interrupted, for example by growth or buildings in the region of sight, the position determination method fails.

Methods which are based on a determination of the position of the instrument itself relative to objects whose position is known are known for a position determination of the actual position, i.e. of the current location of the instrument, also in a dead range shadowed in such a manner. An example of this is the classical trilinear surveying method.

In many cases, a geodetic instrument has only a capability for distance measurement, or a measurement of angles cannot be carried out with the required precision or speed. In these cases, the position determination must be carried out by distance measurements alone. For this purpose, the distances to a plurality of points having a known position are measured, and the determination of the actual position can be effected by known methods, as also used, for example, in photogrammetry; correlation methods or correlation calculations are an example of this. The number of points required is dependent on the position thereof and the intended accuracy of the measurement. However, apart from particularly advantageous configurations, as a rule at least 3 or 4 points are required. If an angle is additionally taken into account, for example by additionally measuring the angle relative to the horizontal, the number of points can be reduced.

In order also to be able to use positions in the dead range for surveying by a purely distance-measuring method, it is first necessary to survey, from known locations, the reference points subsequently required for referencing.

A surveying device suitable for this purpose is described, for example, in European Patent EP 0 403 585 B1. The surveying device has a receiver for a satellite position-measuring system and a preferably electrooptical telemeter or telemeter based on the ultrasonic principle. Both components are mounted on a plumbing staff which can be precisely positioned with its plumbing staff tip and has an inclinometer and a display of the vertical alignment. Optionally, a sensor reacting to the earth's magnetic field may also be present. By means of at least 2 measurements to a point from 2 different known positions which are determined, for example, by the satellite position-measuring system the position of this point can now be determined even if it is within the dead range.

Conversely, the position of such a surveying device in the dead range can also be determined by measurements to a plurality of known points in the trilinear surveying method.

If surveying positions for the geodetic instrument which are both in spaces detected by the positioning system and in dead ranges are to be used in a survey, it is necessary, before using the dead range, to survey corresponding reference points for a subsequent determination of the actual position in the dead range. If it is intended to dispense with an explicit angle measurement, as a rule the distances must be measured at least for three to four points from at least three to four known positions, in order to permit an unambiguous position determination. The number of points actually required in each case is dependent on the position of the known points and any possible limitations for reducing ambiguity. In the case of three distance measurements to a point, a plane across which the position to be determined can be reflected is defined by the three known points. The resulting solution comprises two possible positions, of which, however, one position can generally be ruled out for plausibility reasons, for example because it would lie below the earth's surface, or because of simple further information, such as, for example, the distinction between north and south, which can also be made by means of a simple magnetic compass. An unambiguous determination with three known points is possible if advantageous geometrical conditions are present. This is the case, for example, if the position sought lies on a connecting line between two known points.

Depending on the circumstances of a measurement, at least between 9 and 16 distance measurements must therefore be carried out, for which in each case a correct assignment of measurement to reference point and known position must be effected. Carrying out such measurements manually therefore means a high handling effort and error-producing complexity.

Moreover, in order to achieve sufficient accuracy of the position determination, reference points suitable because of their geometrical arrangement have to be chosen. The position change between the known positions which is to be consciously implemented also has an adverse effect on the measuring process. Finally, the extension of the regions detected by the positioning system and shadowed must be actively observed with such methods of the prior art in order to be able to carry out in good time a change of the positioning method to be used.

SUMMARY

An object of the present invention is to reduce the number of reference points required for determining the actual position in a shadowed region and/or of measurements for determining the position of these reference points.

The increase in the accuracy of the position in the determination of an actual position in a shadowed region is a further object of the present invention.

A further object is the simplification and shortening of the measurements for determining reference points and actual position.

A further object of the invention is to permit automatic identification and surveying of the reference points.

Finally, the automation of the position determination and of the automated change between the respective methods suitable for this purpose is a further object of the present invention.

These objects are achieved, according to the invention, by features of the claims or by features of the subclaims. For example, a method for determining an actual position of a geodetic instrument comprising a positioning system which is based on the reception of shadowable signals and a dead range within which the propagation of the signal is impaired in such a way that a direct determination of the actual position by means of the positioning system is at least limited comprising the following acts: recording of a first piece of image information from a first known position determined by means of the positioning system, the first piece of image information having at least two identifiable reference structures which can be detected at least from a partial region of the dead range and measurement of at least one first distance from the first known position, the first distance being coordinated indirectly or directly with the reference structures; recording of a second piece of image information from a second known position determined by means of the positioning system, the second piece of image information having at least the two identifiable reference structures and measurement of at least one second distance from the second known position, the second distance being coordinated indirectly or directly with the reference structures; recording of a piece of actual image information from an actual position, the actual image information having at least the two identifiable reference structures and measurement of at least one actual distance from the actual position, the actual distance being coordinated indirectly or directly with the reference structures; and derivation of the actual position by referencing relative to the at least two reference structures.

The invention relates to a method and a device for determining the actual position of a geodetic instrument. For this purpose, distance measurements to at least two reference points in each case are carried out by a device in a region in which shadowable signals of a positioning system can be received, at at least two positions. Linked to these distances, image information is additionally recorded by the device. Said information may consist of complete images of a detected region of vision or, for example, of partial images or sections. The measured distances are coordinated with reference structures linked to the image information or present therein. In the simplest case, these reference structures may be points, but also larger or more complex structures. Suitable points are, for example, readily identifiable transitions, edges or intersections of lines, such as, for example, window corners or window crosses. The term image information includes in particular the relative arrangement for individual points. According to the invention, these points are generally linked to distance measurements to objects used as reference structures, these distance measurements being coordinated in each case with the physical pixels of a receiver which represent the object or belong to its copy on the receiver. A logical coordination of distance and reference point can then in turn be derived from the mutual arrangement of the distance measurements. Here, image information is to be understood as meaning in particular also the mutual arrangement or orientation of distance measurements which take place simultaneously to all pixels of a detected region of vision. Thus, an image no longer necessarily consists of the recording of textures or surfaces but may also consist exclusively of distance measurements related to one another and in particular geometrically arranged. Such range imaging therefore gives, for example, a two-dimension arrangement of distance measurements and hence a sort of three-dimensional image or a topography of the detected field of view or measuring field. The measurements can, however, also be coordinated with a normal image which includes texture. For example, brightness and distance can be recorded for each pixel so that precisely these brightness values and distances are available for each piece of image information, which consists, for example, of the position of a physical pixel on the receiver. However, the arrangement of a distance measurement relative to other distance measurements can also be effected so that it is also possible to dispense with a knowledge of the absolute position of a pixel on the receiver. As a result, it is possible, for example, to dispense with a complete evaluation of the region of view detected by the receiver, so that higher processing speeds can be realised, for example with subwindowing or subframing.

The distances can now be measured directly to the reference structures or can also be made to interpolation points, from which distance information relating to the reference structures can then be derived.

For recording images, CCD and CMOS cameras provide a large number of suitable sensors which in the meantime, in some versions, can additionally record distance information for each pixel (range imaging) so that, for example, the three-dimensional images described above can also be derived. If such sensors are used, distance measurements to many points of the image can be effected simultaneously. In principle, however, it is also possible to use scanning solutions in which the image content is surveyed sequentially with regard to its distance, simultaneously with the recording of the image information.

Alternatively, it is also possible, according to the invention, to effect a manual distance measurement to selected points in an image. Suitable methods and devices for manually controlled surveying of points in a detected image are disclosed, for example, in EP 1 314 940 A1. This electronic display and control device described therein permits the selection of points in an image to which measurements can be carried out without it being necessary to effect a movement of the optical axis. By the manual selection of points and the sequential, optionally automatic surveying thereof, distance and image information of the various points are linked.

The actual spatial positions of the reference structures can now be determined from the distance measurements recorded from the at least two known positions and linked to the respective image information. Generally known methods of photogrammetry and of image processing can be used for deriving this information. In particular, the degrees of freedom can be limited from step to step or from known position to the next successive position. This means that a further or more accurate determination of the spatial positions of the reference structure is made with each known position from which a measurement is effected. The number of required positions and number of recorded parameters, as well as the intended accuracy of the position determination, are correlated with one another. Linking of image information and distance information offers a large number of advantages over the sequential surveying of individual points. Because the measurements are made simultaneously or at times close to one another and are arranged as images, coordination problems are avoided. In addition, the detection of the spatial arrangement or sequence of the measurements provides additional information which can be used for the subsequent determination of the actual position.

In addition, by recording images divided into pixels, it is possible to conclude the angle of a reference structure relative to a reference point. If, for example, an image recording is always made with horizontal alignment of the camera axis, the angle relative to the horizontal can be derived from the position of a pixel. Equally, the points can also be described in terms of their position relative to one another.

Since not all points of a detected image are required, the number of reference structures can be limited to easily and clearly recognizable image regions so that even partial images or images changed by image processing, for example by increasing the contrast, are used or stored. Regarding the choice of a particularly suitable partial region of the image which is furthermore to be considered, CMOS sensors which permit subwindowing or the definition of a special region of interest in the image recording can advantageously be used.

Known image processing and surveying methods exist for identification of structures in various images and any automatic surveying which may be effected. Thus, a method and a device for geodetic surveying of an object with the aid of image processing are described, for example, in the European Patent Application no. 03011908 not yet published on the date of filing. Templates which can be placed on the representational image can be used for fixing the target point and automating a surveying process. Furthermore, the derivation of precise angle information from a representational image is permitted.

After the recording of the image and distance information from the two known positions, the actual position can also be determined in the dead range. For this purpose, a recording and measurement is once again carried out, in which a region of view which contains at least two of the reference structures must be covered. From a knowledge of the reference structures, it is possible to conclude the actual position, for example by a trilinear surveying method. For this purpose, the actual positions of the reference structures must have been derived.

Alternatively, however, it is also possible to dispense with a determination of these positions, by deriving the actual position by means of a transformation from the two known positions. The actual position is therefore linked not via the intermediate step of the calculated positions of reference structures but to the two known positions from which the measurements were carried out. The measurement of the reference structures serves only for deriving the suitable transformation matrices.

By means of the large number of recorded measurements, ambiguities of the solutions can be eliminated and a sufficient accuracy of the actual position can be ensured.

One possibility for carrying out the method in a completely automated manner using an embodiment of the device according to the invention permits surveying in regions which are accessible to the signals of the positioning system or are shadowed, without paying particular attention to the limit of these regions during the measuring process. For this purpose, the device is formed in such a way that, during the surveying process, its detection region is always coarsely aligned with a clearly visible region. Images of this region together with the measured distances are recorded automatically and continuously. The identification of the reference points in the region of detection or in the images is effected automatically and by means of image processing methods. The continuous recordings carried out constantly during the surveying pass through various points whose position is determined by the positioning system or whose position is in any case known, for example since said points are previously measured points or trigonometrical points. Provided that the signals of the positioning system are detected to an extent sufficient for determining the actual position, the positioning system is used for the position determination. However, if the reception deteriorates or is completely interrupted the device automatically switches to the method according to the invention for referencing on the basis of reference points. Here, a warning or an indication can also be output to the user at the same time. This makes it possible to carry out surveys without taking into account the limitations due to any shadowed signals. Particularly in strongly transected regions it is necessary to choose only two known starting points from which the method then also permits measurements in dead ranges, for example in street canyons.

In principle, the method according to the invention can also be used in regions in which reception of signals of a positioning system is possible. In this respect, the use of the method is not limited to the use in dead ranges.

In this context, the term "geodetic instrument" is always to be understood generally as meaning a measuring instrument or an instrument which is used in association with geodetic measurements, such as, for example, a plumbing staff, this serving for the measurement or checking of data having a spatial reference. In particular, this relates to the measurement of distance and/or direction or angles to a reference point or measuring point. In addition, however, further devices, for example components for image recording or for communication with other system components, may be present and can be used for supplementary measurements or data recordings.

In particular, such a geodetic instrument is to be understood here as meaning theodolites and also so-called total stations as tacheometers with electronic angle measurement and electrooptical telemeter. Equally, the invention is suitable for use in specialised devices having a similar functionality, for example in military aiming circles or in the monitoring of industrial structures or processes; these systems are herewith also covered by the term "geodetic instrument".

BRIEF DESCRIPTION OF THE DRAWINGS

The method according to the invention and a device according to the invention are described in more detail below, purely by way of example, with reference to working examples shown schematically in the drawing. Specifically.

DETAILED DESCRIPTION

Figure 1:
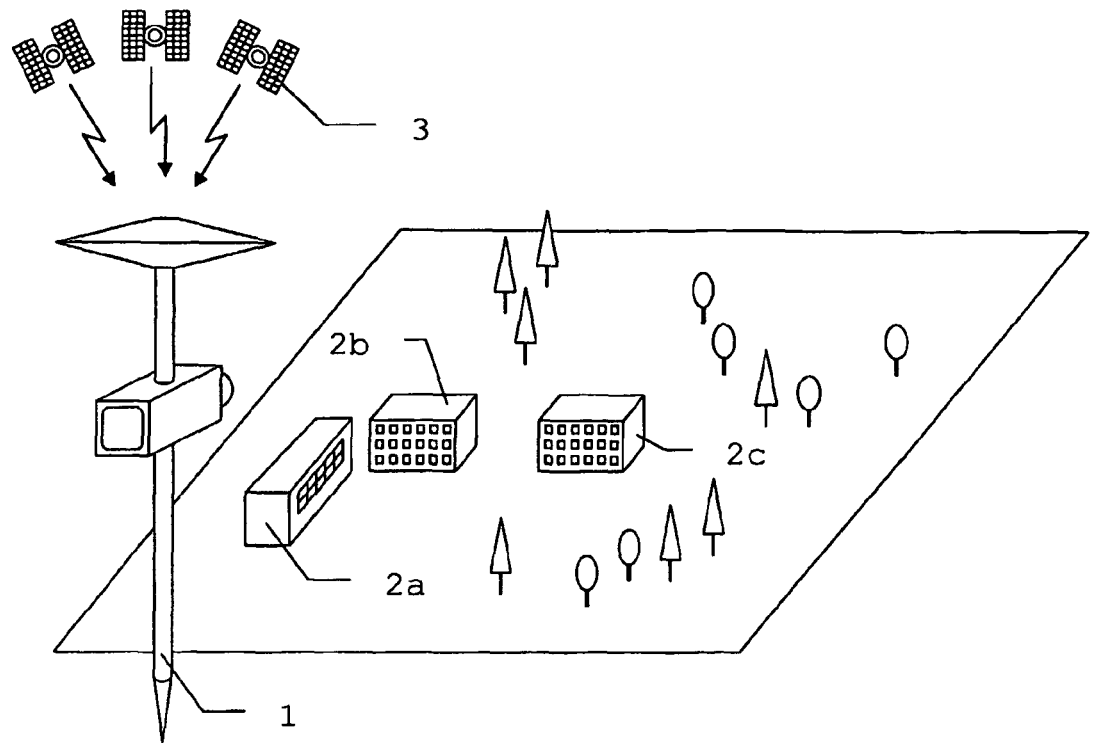
FIG. 1 shows the schematic diagram of a surveying task using a positioning system with shadowable signals.

FIG. 1 shows a typical surveying task with the use of a positioning system. The aim of the surveying is to determine the position of various points on an object 2c which is arranged in a building group together with a hall 2a and a building 2b. Surveying is effected using a geodetic instrument 1 which has the components necessary for the respective surveying task. The actual position of this instrument 1 which represents the current position to be determined in each case for the purpose of surveying, can be determined on the basis of the signals of a positioning system, this being assumed here purely by way of example to be a satellite-supported system. The actual position can be derived from the signals of the satellites 3, which signals are received by a satellite receiver of the instrument 1 and propagate substantially linearly.

Figure 2:
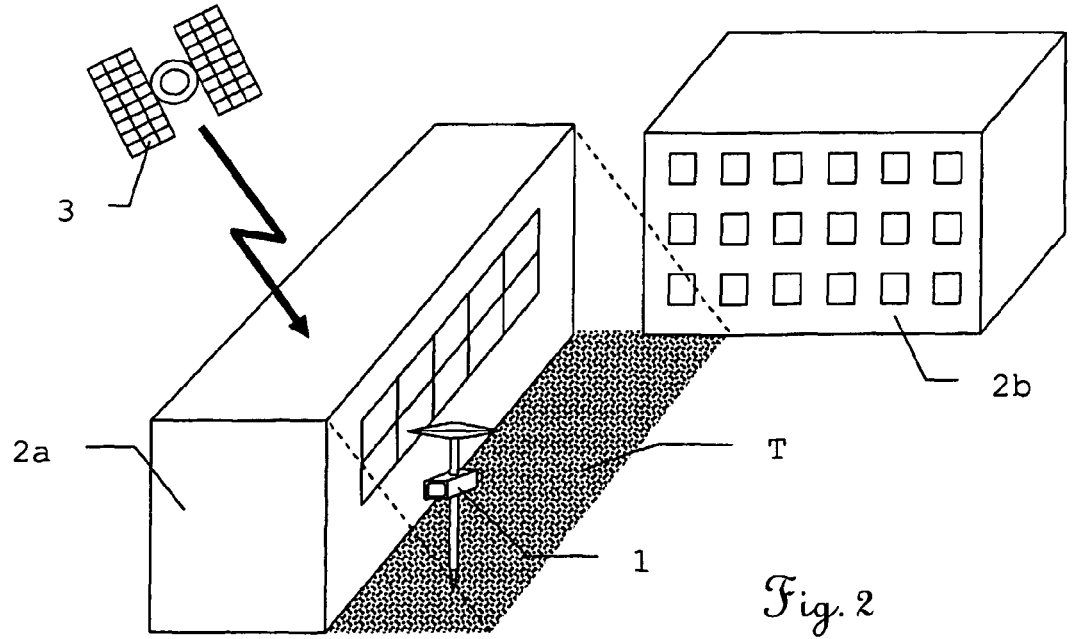
FIG. 2 shows an example of the formation of shadowed regions with the use of a satellite-supported positioning system.

FIG. 2 schematically shows the situation in the immediate vicinity of the object to be surveyed. If it is necessary for surveying purposes to position the instrument 1 in the immediate vicinity of the hall 2a, the line of sight to the satellites 3 required for the determination of the actual position is interrupted by the height of the hall 2a. The hall 2a therefore defines a dead range T in which the reception of signals of the satellites 3 is limited or prevented. The surveying of the object can no longer be effected from this dead range T, since the actual position can no longer be determined with the aid of the positioning system. However, the building 2b is clearly visible from this dead range T.

Figure 3:
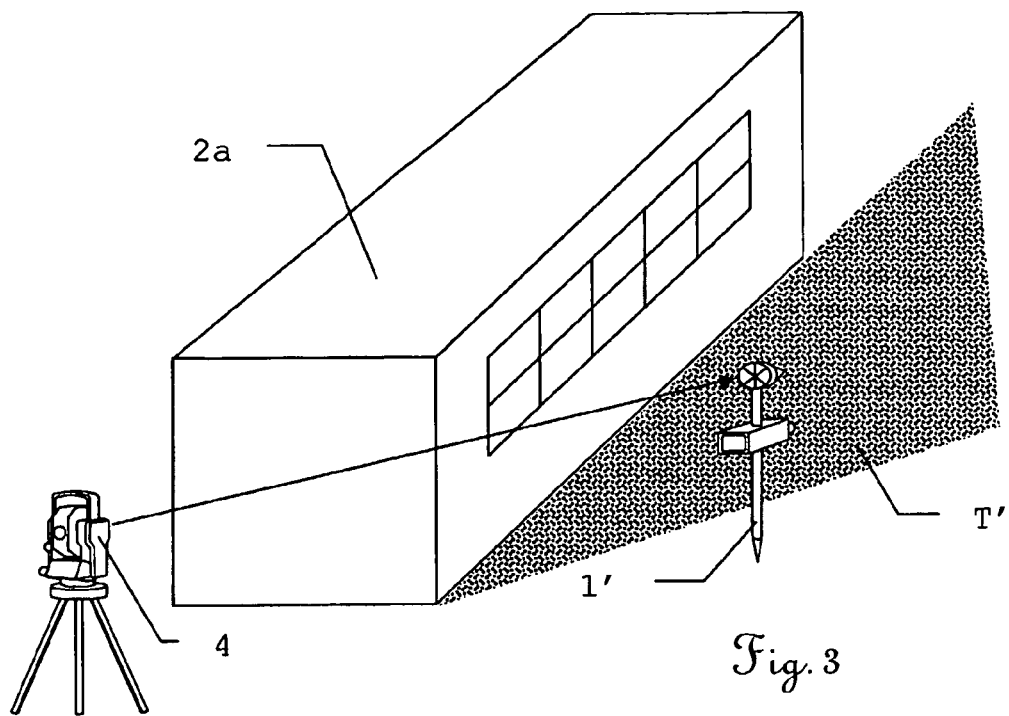
FIG. 3 shows an example of the formation of shadowed regions with the use of an Earth-supported positioning system.

A similar situation is shown in FIG. 3 for another variant of a positioning system. In a surveying task identical to FIG. 2, an instrument 1' whose position is determined with the aid of a total station 4 as a total positioning system is now used. For this purpose, the instrument carries a reflector instead of a satellite receiver, so that direction and distance to the reflector is measured from the total station 4 positioned on a known point. From this data, the actual position of the instrument 1' can be determined. In a manner similar to the diagram of FIG. 2, the line of sight between total station 4 and instrument 1', which is required for the measurement, is also limited or interrupted by the hall 2a in certain regions, so that a dead range T' likewise forms.

Figure 4:
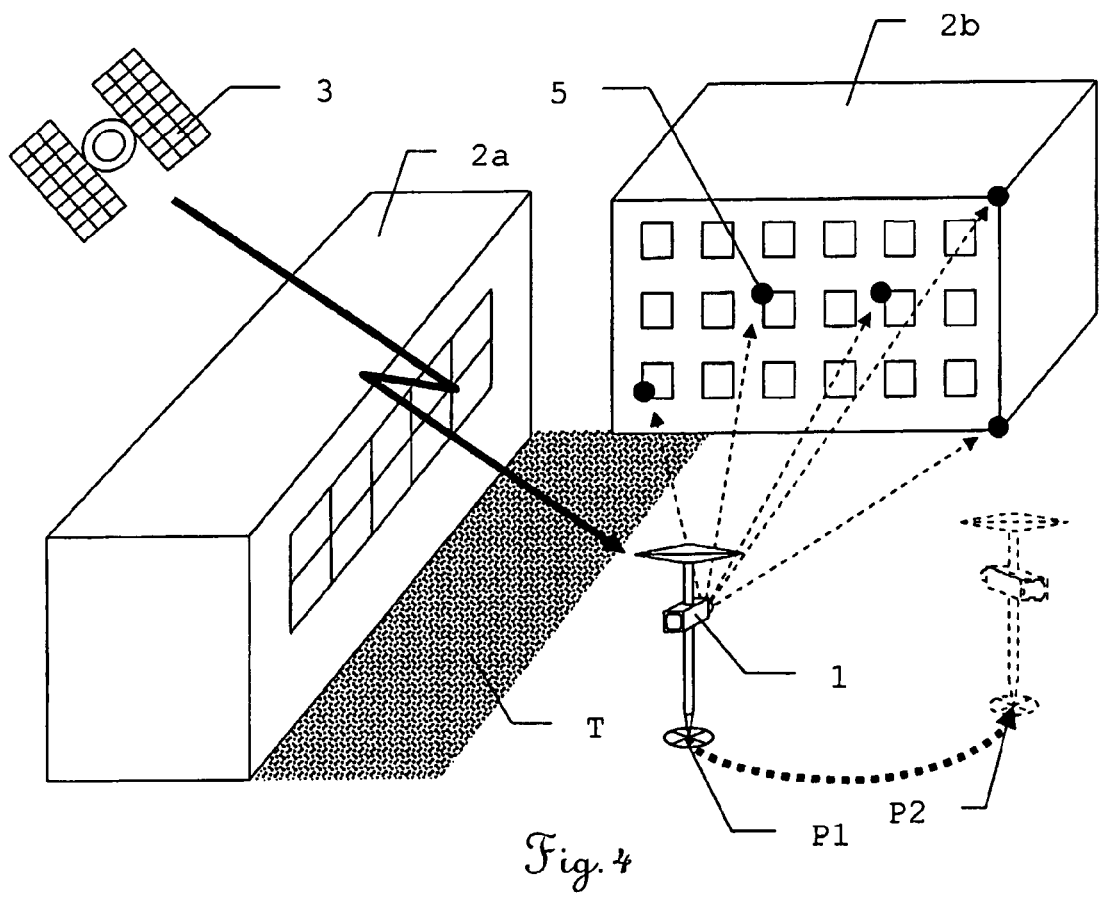
FIG. 4 shows the schematic diagram of the first step of the method according to the invention with the use of a satellite-supported positioning system.

FIG. 4 schematically shows the first step of an exemplary method according to the invention for determining the actual position. For a first known position P1, at least two reference structures 5 on the building 2b also detectable from the dead range T are detected by means of the instrument 1 and a distance to these reference structures 5 is measured. In this example, points are chosen purely by way of example as reference structures 5, but, in particular by means of image processing methods, it is also possible to choose extensive structures and to compare them with one another in the further steps. Reference structures located in the dead range T itself can also be chosen, i.e. a measurement could also be effected according to the invention to a reference structure or a point on the hall 2a. The distance measurement is effected with the use of the recording of an image in which the distances are coordinated with the reference structures 5. In this example, the first known position P1 can be determined by the signals of satellites 3 since this first known position P1 is present outside the dead range T produced by the hall 2a. After the recording of the reference structures 5 with the coordinated image information and distances, the instrument 1 is moved to a second known position P2.

Figure 5:
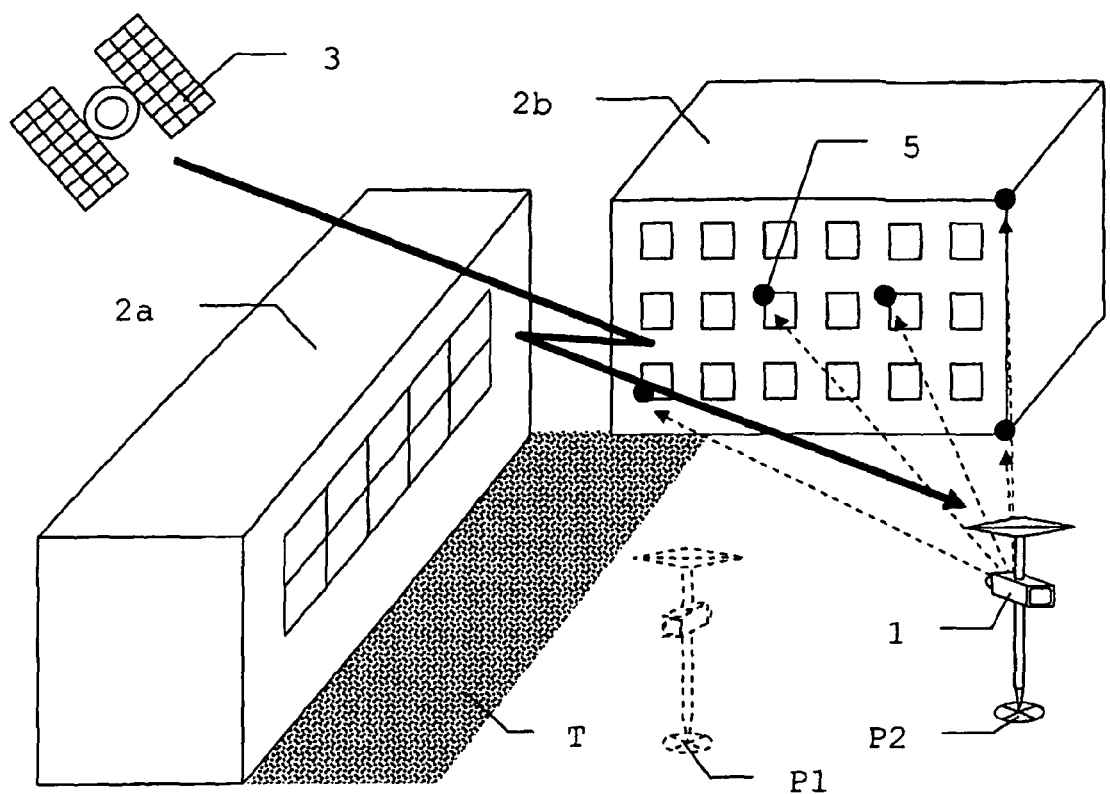
FIG. 5 shows the schematic diagram of the second step of the method according to the invention with the use of a satellite-supported positioning system.

As shown in FIG. 5, a second recording of the reference structures 5 present on the building 2b, together with the coordinated image information and distances, is made from the second known position P2. In this example, the second known position P2 can also be determined by the signals of the satellites 3 of a positioning system. Alternatively, however the first known position P1 and/or the second known position P2 can also be determined by other methods or their position may also be known. In principle, one or both of the positions can therefore also be located in the dead range T but the position must then also be capable of being determined without a positioning system or must be known. As in the case of all movements shown, the detection of the reference structures 5 can be permitted or facilitated by automatic target tracking.

Figure 6:
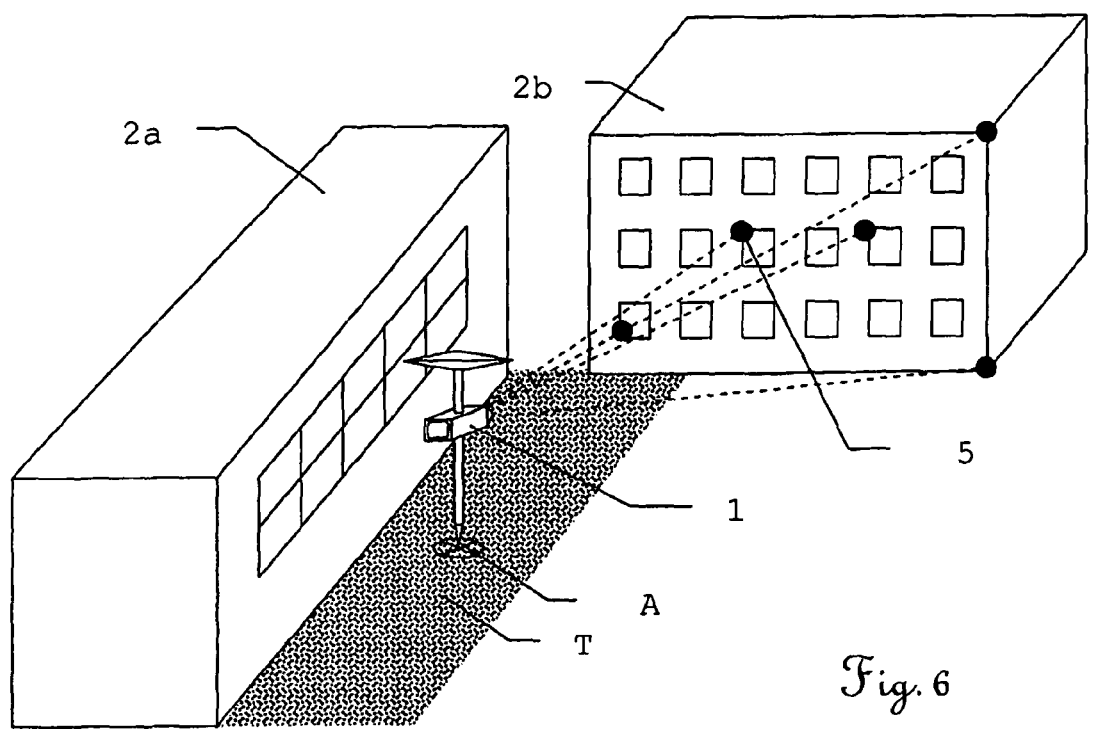
FIG. 6 shows the schematic diagram of the determination of an actual position in a shadowed region by the method according to the invention in a first embodiment.

FIG. 6 schematically shows the determination of an actual position A with the aid of a first embodiment of the method according to the invention. The instrument 1 is now present in the dead range T produced by the hall 2a. From this dead range T the building 2b and at least a part of the reference structures 5 can be detected, so that the actual position A can be determined by means of these reference structures 5. In the first embodiment of the method according to the invention, this determination is based on the knowledge of the actual position of the reference structures 5, these being calculated from the image information and distances which were recorded during the steps shown in FIG. 4 and FIG. 5. For deriving the actual position A, the image information and distance of the reference structures 5 are recorded in a manner similar to the first two steps so that the actual position can be determined from the knowledge of these data and the known position of the reference structures 5, for example by means of a trilinear surveying method. In addition to the consideration of isolated reference structures 5 present in the image, an evaluation of the various pieces of image information can also be effected by extensive matching by image processing, for example by suitable matching methods, a larger number of points being taken into account simultaneously.

Figure 7:
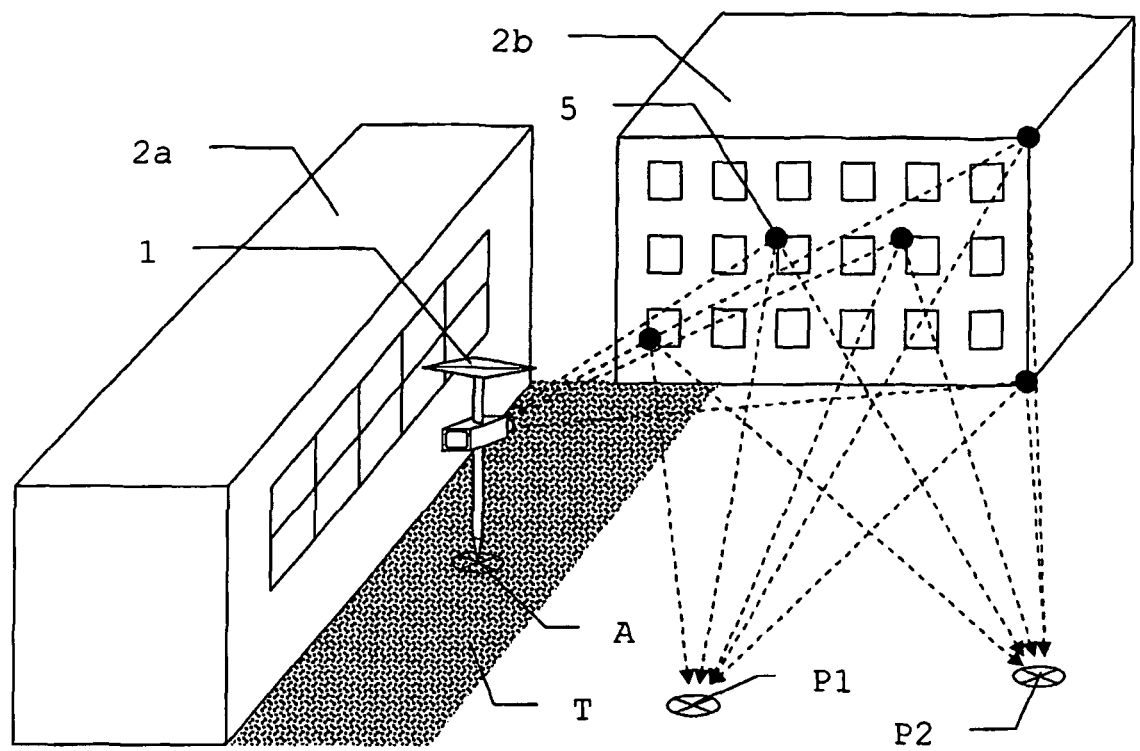
FIG. 7 shows the schematic diagram of the determination of an actual position in a shadowed region by the method according to the invention in a second embodiment.

FIG. 7 schematically explains the determination of an actual position A with the aid of a second embodiment of the method according to the invention. The instrument 1 is present in the dead range T produced by the hall 2a, from which dead range the building 2b and at least a part of the reference structures 5 can be detected. In this second embodiment of the method according to the invention, the determination of the actual position A is effected by means of a transformation of the first known position P1 and second known position P2 shown in FIG. 4 and FIG. 5 to the actual position A. The link between these positions is made via the reference structures 5, for which transformation matrices are derived in each case. Such transformation methods are, for example, known or derivable from photogrammetry. Thus, in this second embodiment of the method according to the invention no real positions for the reference structures 5 are calculated, so that errors occurring in the calculation can be avoided.

Figure 8:
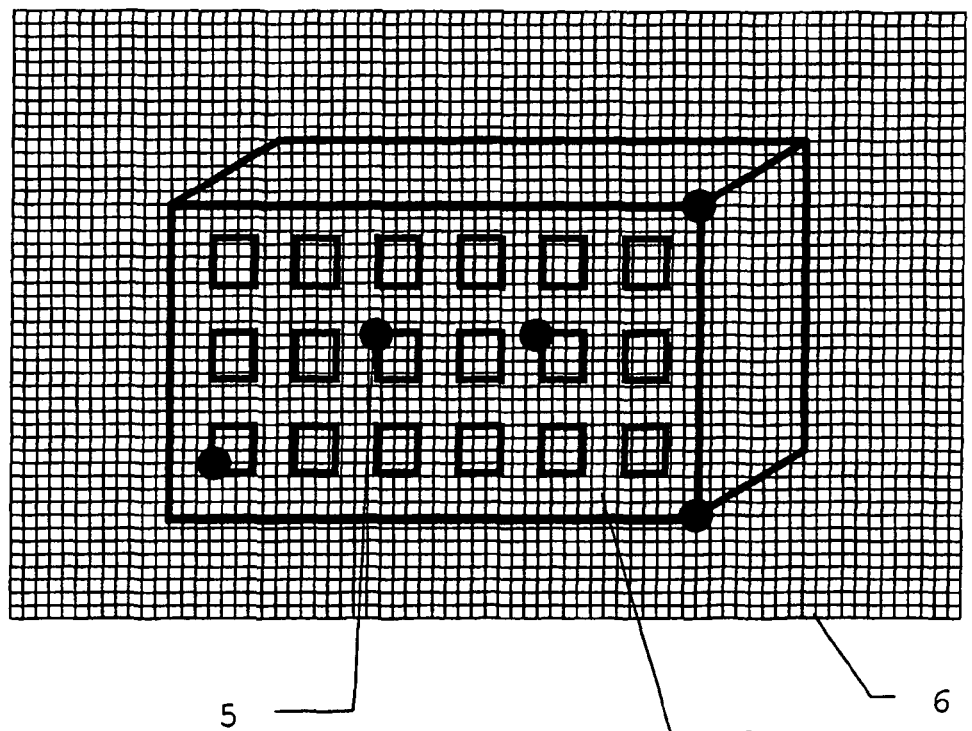
FIG. 8 shows the schematic diagram of the recording of reference structures and the distances coordinated with them.

FIG. 8 shows, purely by way of example, the recording of reference structures and distances linked thereto. By means of a component for image recording, for example a CCD or CMOS camera, preferably having range imaging functionality, the building 2b is captured in an image 6 and this is optionally stored. The image 6 consists of a relatively large number of pixels, it being possible for the reference structures 5 to be coordinated in their dimensions in each case with only one pixel or with a plurality of pixels. Distance measurements are carried out to these reference structures, it being possible for both reference structures 5 and the measuring points of the distance measurement to be determined manually or in an automated manner. Known image processing methods, such as, for example, template matching and/or neuronal networks, are available for automated selection and identification of suitable structures. In the case of relatively large structures, distance measurements can be carried out both to each individual pixel and to a single pixel coordinated with the reference structure 5, from which the distance information for further pixels can then be extrapolated. In the example shown, distance measurements can be carried out to all five detected points as reference structures 5, it being possible for the distance to be coordinated equally with the respective mean pixel (pixel corresponding to the centre of gravity) or with all pixels covered by the respective point.

Figure 9:
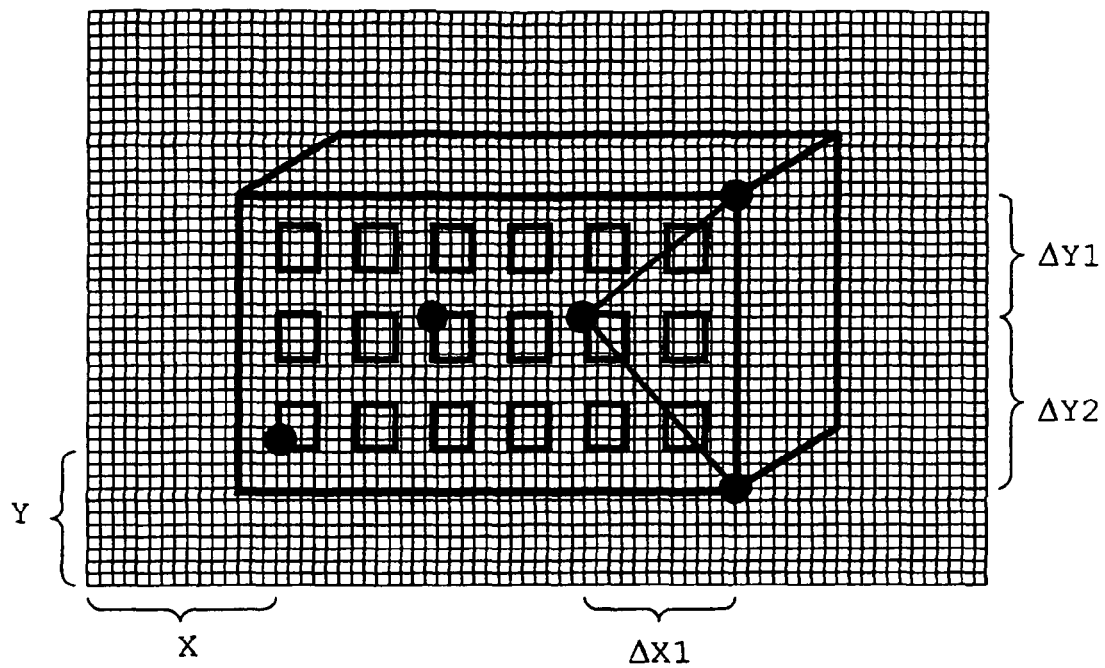
FIG. 9 shows the schematic diagram of the derivation of image information from the recording of reference structures.

FIG. 9 shows, purely by way of example the derivation of image information from the recording of reference structures. The example shown here serves merely to explain the principle, since, in embodiments realised, predominantly more highly developed methods of image processing can advantageously be used, which, however, does not rule out purely manual handling. In addition to the point- or structure-specific distance information, it is possible to derive from the recording further image information which relates, for example, to the position in the image or the relative arrangement of the reference structures 5 to one another. For example, the position of the point located furthest left can be determined by horizontal and vertical counting of the pixels. From the horizontal number X and the vertical number Y of pixels, the position in the image as well as relative to a reference point can be determined, which reference point may be the lower left corner of the detected image section here. Equally, the positions of the points relative to one another can also be surveyed, as illustrated by the differences $\Delta X1$, $\Delta Y1$ and $\Delta Y2$ of pixels between individual points. From the differences, it is also possible to derive angles on the basis of the existing distance measurements to the points. Thus, in addition to the distance measurement, information about the arrangement of the reference structures relative to one another and relative to a reference point can also be simultaneously captured, which information can be compared as image information with the image information of further recordings. It is not necessary for a method according to the invention to record or store complete images. What is relevant is a recording of image information or image features which permit a comparison with further recordings. For this purpose, for example, special regions of the capture area (regions of interest) can be selected or the representation of the captured area can be processed so that structures are emphasised and are easier to recognise. In this respect, image information is not always in coincidence with the recording of a full image but can in each case contain more or less information.

Figure 10:
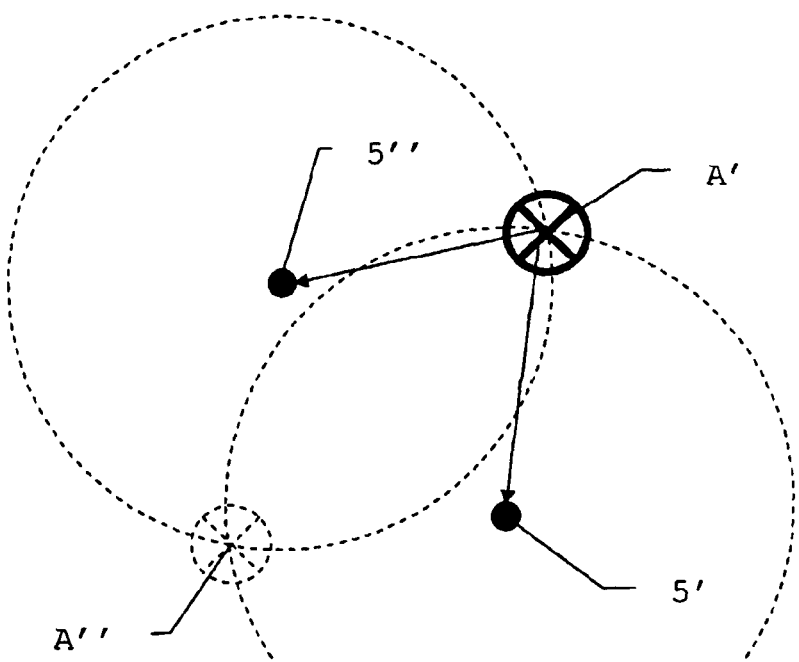
FIG. 10 shows an example for explaining the use of image information for eliminating ambiguities in the position determination and FIG. 11 shows the schematic diagram of an embodiment of the device according to the invention and of a geodetic instrument according to the invention.

FIG. 10 shows a greatly simplified, two-dimensional example for explaining the use of image information for eliminating ambiguities in the position determination. Two reference structures 5 and 5' whose position is known are available for deriving the actual position. The distance to both reference structures 5 and 5' is measured so that the actual position must lie on a circle at the respective distance around the position of the respective reference structure 5 or 5'. Simultaneous fulfilment of this condition is present only at the two points of intersection of the circles. Without further information it cannot now be decided which of the two actual positions A' or A" resulting therefrom is correct. From the recording of an image, it is possible to derive, as image information, the fact that, in all measurements, the second reference structure 5" was always located to the right of the first reference structure 5', so that the possible actual position A" is ruled out. This greatly simplified and purely qualitative example is intended to explain how image information can be used in a fundamental manner for reducing ambiguities. Pure disorganised capture of distance measurements to various points does not include the necessary information relating to the arrangement. Moreover, quantitative image information, such as, for example, the angles of the reference structures to one another can also be derived from the recordings.

Figure 11:
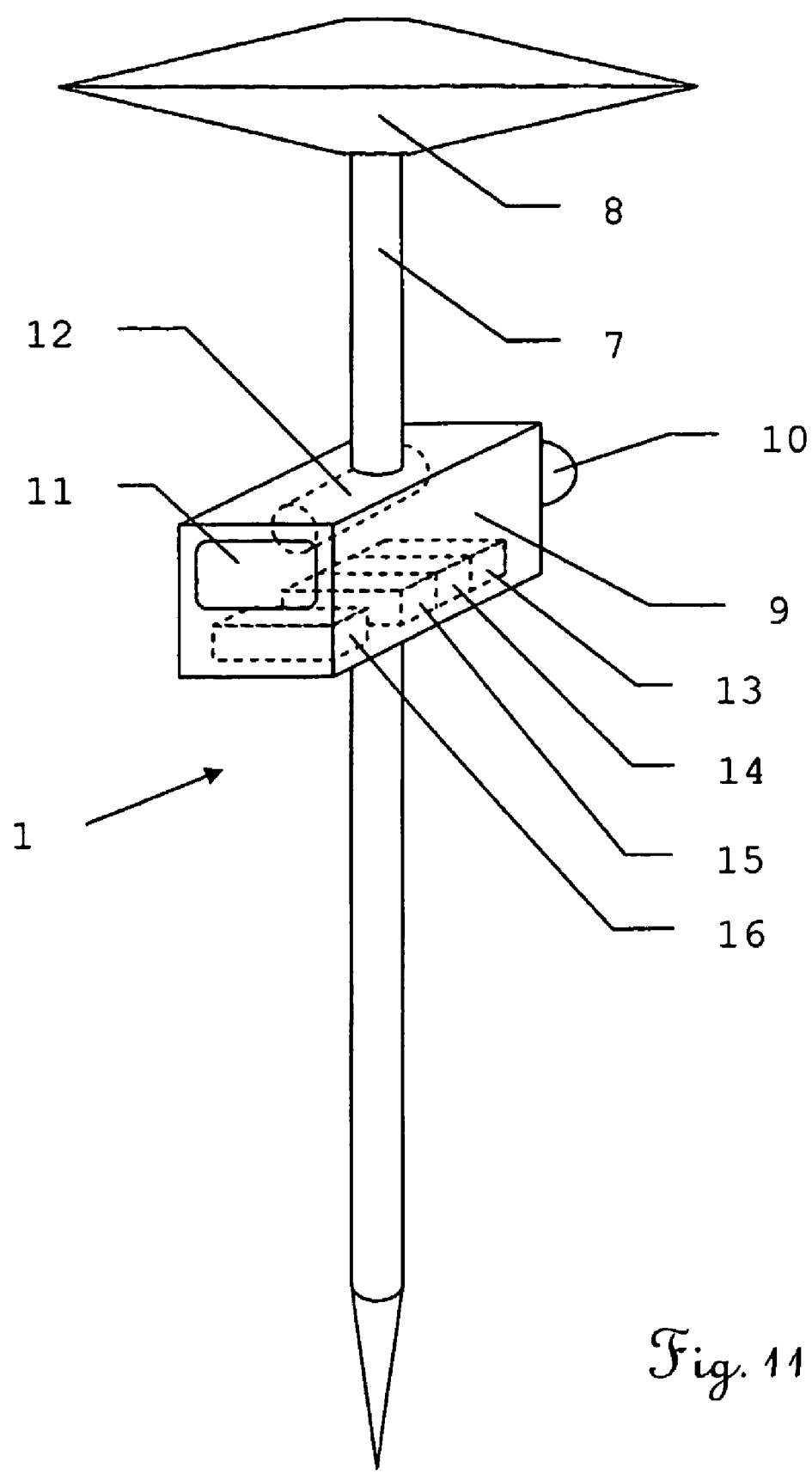

The schematic diagram of a possible embodiment of the device according to the invention and of a geodetic instrument 1 according to the invention is shown in FIG. 11. The geodetic instrument 1 has a plumbing staff 7 which can be accurately positioned by means of a tip. A GPS receiver 8 for a satellite-supported positioning system as a unit for position determination and a measuring unit 9 comprising a device for determining an actual position of the geodetic instrument 1 are present on the plumbing staff 7. This device has an image recording unit 10, an image and/or image information memory 13, a telemeter 12 and a data processing unit 14. The region captured by the image recording unit 10 is indicated to the user on a touch-sensitive screen 11, it being possible for the user to control the surveying process by means of this screen. If the intensity of the signal of the positioning system falls below a predetermined threshold, the loss of signal is indicated to the user by means of an alarm. Optionally, the transition to an automated procedure for the method according to the invention can be triggered by the data processing unit 14. Moreover, the device may optionally have an inclinometer 15 and/or a direction meter 16.

The figures show the steps of the method, buildings and instruments used purely schematically. In particular no size relationships or details of the image processing or surveying of the reference structures are evident from the diagrams. The points shown purely by way of example as reference structures also represent more complicated structures which can be handled with regard to surveying and evaluation by image processing means.

I claim:
1. A method for determining an actual position of a geodetic instrument comprising a global positioning system which is based on the reception of shadowable signals of the global positioning system and a dead range within which the propagation of the shadowable signals of the global positioning system are impaired in such a way that a direct determination of the actual position by means of the global positioning system is at least limited comprising the following acts:
   recording of a first piece of image information from a first known position determined by means of the global positioning system which is based on the reception of shadowable signals of the global positioning system and the dead range within which the propagation of the shadowable signals of the global positioning system are impaired in such a way that a direct determination of the actual position by means of the global positioning system is at least limited, the first piece of image information having at least two identifiable reference structures on a building which can be detected at least from a partial region of the dead range and measurement of at least one first distance from the first known position, the first distance being coordinated indirectly or directly with the said at least two identifiable reference structures on the building;
   recording of a second piece of image information from a second known position determined by means of the glo- bal positioning system, wherein the global positioning system includes a satellite-supported system, the second piece of image information having at least the said two identifiable reference structures on the building and measurement of at least one second distance from the second known position, the second distance being coordinated indirectly or directly with the said at least two identifiable reference structures on the building;

recording of a piece of actual image information from the actual position, the actual image information having the said at least two identifiable reference structures on the building and measurement of at least one actual distance from the actual position, the actual distance being coordinated indirectly or directly with the said at least two identifiable reference structures on the building, wherein the recording of the first and second pieces of image information and the measurement of the first and second distances are carried out in an automated manner; and derivation of the actual position of the geodetic instrument by referencing relative to the said at least two identifiable reference structures on the building, wherein in the derivation of the actual position, a transformation is used which links the actual position via the said at least two identifiable reference structures on the building in the first and second image information to the first known position and the second known position, wherein the said at least two identifiable reference structures on the building are tracked and/or identified automatically.

2. The method according to claim 1, further comprising repeating individual acts or a plurality of the acts set forth in claim 1.

3. The method according to claim 1, wherein one distance is measured in each case in the measurement of the distances to each of the said at least two identifiable reference structures on the building.

4. The method according to claim 1, wherein a measurement of the distance to each point of a detected image is effected in the recording of the image information.

5. The method according to claim 1, wherein the derivation of the actual position is effected by means of a triliniear surveying method.

6. The method according to claim 1, wherein the measurement of the distances is carried out by means of optical distance measurement.

7. The method according to claim 6, wherein the measurement of the distances is carried out by means of laser distance measurement.

8. The method according to claim 1, wherein the global positioning system includes an Earth-supported system.

9. The method according to claim 8, wherein the global positioning system includes a Total Positioning System.

10. The method according to claim 1, wherein at least the first piece of image information is stored and the said at least two identifiable reference structures on the building in the second piece of image information and/or the actual image information are identified by image processing methods.

11. The method according to claim 10, wherein the said at least two identifiable reference structures on the building in the second piece of image information and/or the actual image information are identified by matching methods.

12. The method according to claim 1, wherein the recording of the first and second pieces of image information and the measurement of the first and second distances are constantly repeated.

13. A device for determining an actual position of a geodetic instrument, the device comprising the following:

an image recording unit;
a telemeter; and
a data processing unit configured to derive the actual position, wherein the device is configured to perform the following method in an automated manner:

recording of a first piece of image information from a first known position determined by means of a global positioning system which is based on the reception of shadowable signals of the global positioning system and the dead range within which the propagation of the shadowable signals of the global positioning system are impaired in such a way that a direct determination of the actual position by means of the global positioning system is at least limited, the first piece of image information having at least two identifiable reference structures on a building which can be detected at least from a partial region of the dead range and measurement of at least one first distance from the first known position, the first distance being coordinated indirectly or directly with the said at least two identifiable reference structures on the building;

recording of a second piece of image information from a second known position determined by means of the global positioning system, wherein the global positioning system includes a satellite-supported system, the second piece of image information having at least the said two identifiable reference structures on the building and measurement of at least one second distance from the second known position, the second distance being coordinated indirectly or directly with the said at least two identifiable reference structures on the building;

recording of a piece of actual image information from the actual position, the actual image information having the said at least two identifiable reference structures on the building and measurement of at least one actual distance from the actual position, the actual distance being coordinated indirectly or directly with the said at least two identifiable reference structures on the building, wherein the recording of the first and second pieces of image information and the measurement of the first and second distances are carried out in an automated manner; and derivation of the actual position of the geodetic instrument by referencing relative to the said at least two identifiable reference structures on the building, wherein in the derivation of the actual position, a transformation is used which links the actual position via the said at least two identifiable reference structures on the building in the first and second image information to the first known position and the second known position, wherein the said at least two identifiable reference structures on the building are tracked and/or identified automatically.

14. The device according to claim 13, wherein the image recording unit includes an image memory and/or an image information memory.

15. The device according to claim 13, wherein the telemeter is a laser telemeter.

16. The device according to claim 13, wherein the telemeter is integrated in the image recording unit.

17. The device according to claim 16, wherein the telemeter is integrated in the image recording unit in the form of a range imaging sensor or of scanning telemeter.

18. The device according to claim 16, wherein the data processing unit is formed in such a way that a limitation of the direct determination of the actual position by means of the global positioning system is recognizable and an alarm and/or an automated derivation of the actual position is triggered.

19. The device according to claim 16, further comprising an inclinometer.

20. The device according to claim 16, further comprising a direction meter.

21. The device according to claim 20, wherein the direction meter includes a magnetic compass.

22. A geodetic instrument comprising a unit for global position determination by means of a global positioning system based on the reception of shadowable signals of the global positioning system and a device comprising: an image recording unit;
a telemeter, wherein the telemeter is integrated in the image recording unit;
and a data processing unit configured to derive an actual position, wherein the device is configured to perform the following method in an automated manner:
recording of a first piece of image information from a first known position determined by means of the global positioning system which is based on the reception of shadowable signals of the global positioning system and the dead range within which the propagation of the shadowable signals of the global positioning system are impaired in such a way that a direct determination of the actual position by means of the global positioning system is at least limited, the first piece of image information having at least two identifiable reference structures on a building which can be detected at least from a partial region of the dead range and measurement of at least one first distance from the first known position, the first distance being coordinated indirectly or directly with the said at least two identifiable reference structures on the building;
recording of a second piece of image information from a second known position determined by means of the global positioning system, wherein the global positioning system includes a satellite-supported system, the second piece of image information having at least the said two identifiable reference structures on the building and measurement of at least one second distance from the second known position, the second distance being coordinated indirectly or directly with the said at least two identifiable reference structures on the building;
recording of a piece of actual image information from the actual position, the actual image information having the said at least two identifiable reference structures on the building and measurement of at least one actual distance from the actual position, the actual distance being coordinated indirectly or directly with the said at least two identifiable reference structures on the building, wherein the recording of the first and second pieces of image information and the measurement of the first and second distances are carried out in an automated manner; and
derivation of the actual position of the geodetic instrument by referencing relative to the said at least two identifiable reference structures on the building, wherein in the derivation of the actual position, a transformation is used which links the actual position via the said at least two identifiable reference structures on the building in the first and second image information to the first known position and the second known position, wherein the said at least two identifiable reference structures on the building are tracked and/or identified automatically.

23. The geodetic instrument according to claim 22, wherein the unit for global position determination including a reflector for geodetic surveying or a GPS receiver.

24. A non-transitory data medium having a computer program stored on the data medium for carrying out the method comprising;
recording of a first piece of image information from a first known position determined by means of a global positioning system which is based on the reception of shadowable signals of the global positioning system and the dead range within which the propagation of the shadowable signals of the global positioning system are impaired in such a way that a direct determination of the actual position by means of the global positioning system is at least limited, the first piece of image information having at least two identifiable reference structures on a building which can be detected at least from a partial region of the dead range and measurement of at least one first distance from the first known position, the first distance being coordinated indirectly or directly with the said at least two identifiable reference structures on the building;
recording of a second piece of image information from a second known position determined by means of the global positioning system, wherein the global positioning system includes a satellite-supported system, the second piece of image information having at least the said two identifiable reference structures on the building and measurement of at least one second distance from the second known position, the second distance being coordinated indirectly or directly with the said at least two identifiable reference structures on the building;
recording of a piece of actual image information from the actual position, the actual image information having the said at least two identifiable reference structures on the building and measurement of at least one actual distance from the actual position, the actual distance being coordinated indirectly or directly with the said at least two identifiable reference structures on the building, wherein the recording of the first and second pieces of image information and the measurement of the first and second distances are carried out in an automated manner; and
derivation of the actual position of the geodetic instrument by referencing relative to the said at least two identifiable reference structures on the building, wherein in the derivation of the actual position, a transformation is used which links the actual position via the said at least two identifiable reference structures on the building in the first and second image information to the first known position and the second known position, wherein the said at least two identifiable reference structures on the building are tracked and/or identified automatically.

* * * * *